Figure 1:
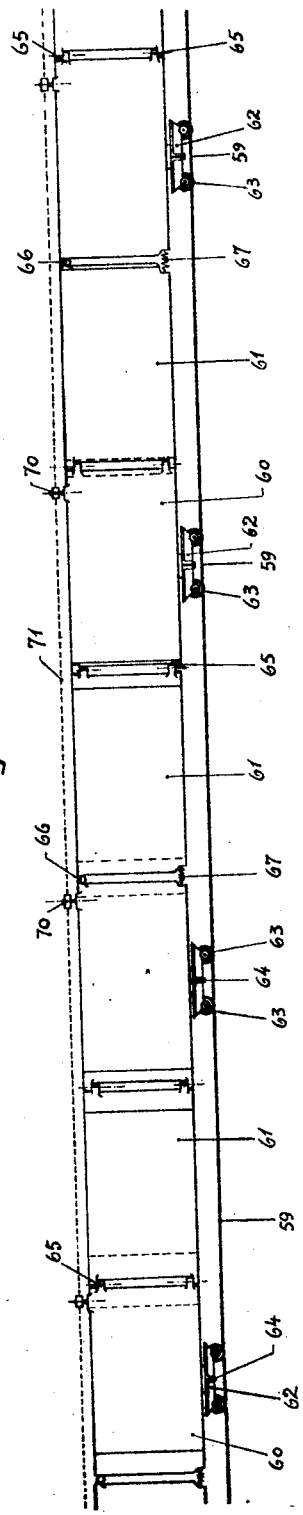

Aug. 20, 1929.　　F. KRUCKENBERG　　1,725,653
ARRANGEMENT FOR THE INTENSE TRANSPORTATION OF PERSONS
Filed June 3, 1927　　13 Sheets-Sheet 1

Aug. 20, 1929.   F. KRUCKENBERG   1,725,653
ARRANGEMENT FOR THE INTENSE TRANSPORTATION OF PERSONS
Filed June 3, 1927   13 Sheets-Sheet 2

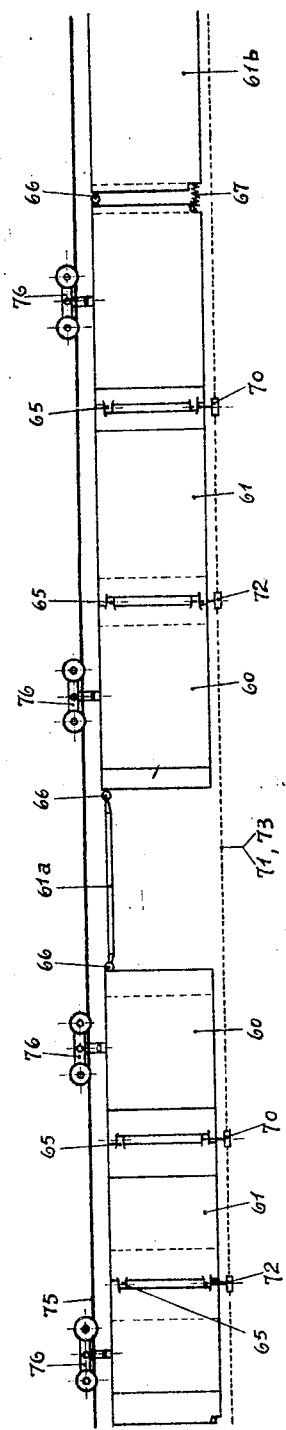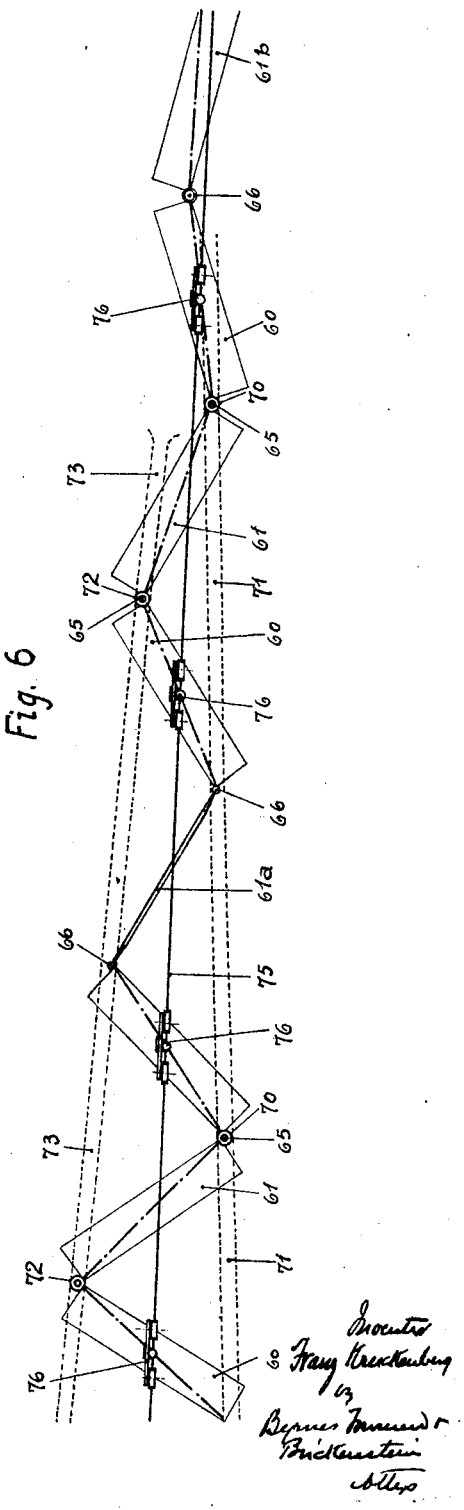

Aug. 20, 1929.  F. KRUCKENBERG  1,725,653
ARRANGEMENT FOR THE INTENSE TRANSPORTATION OF PERSONS
Filed June 3, 1927  13 Sheets-Sheet 4

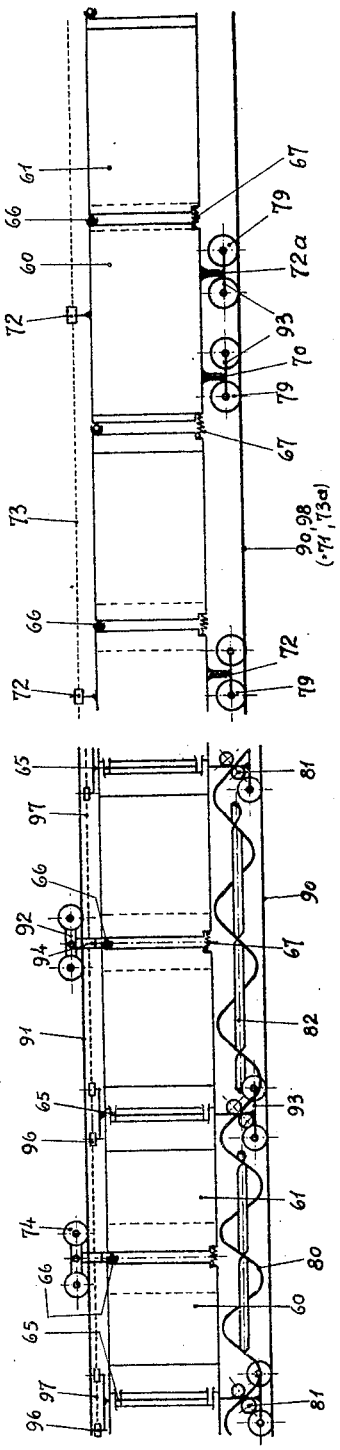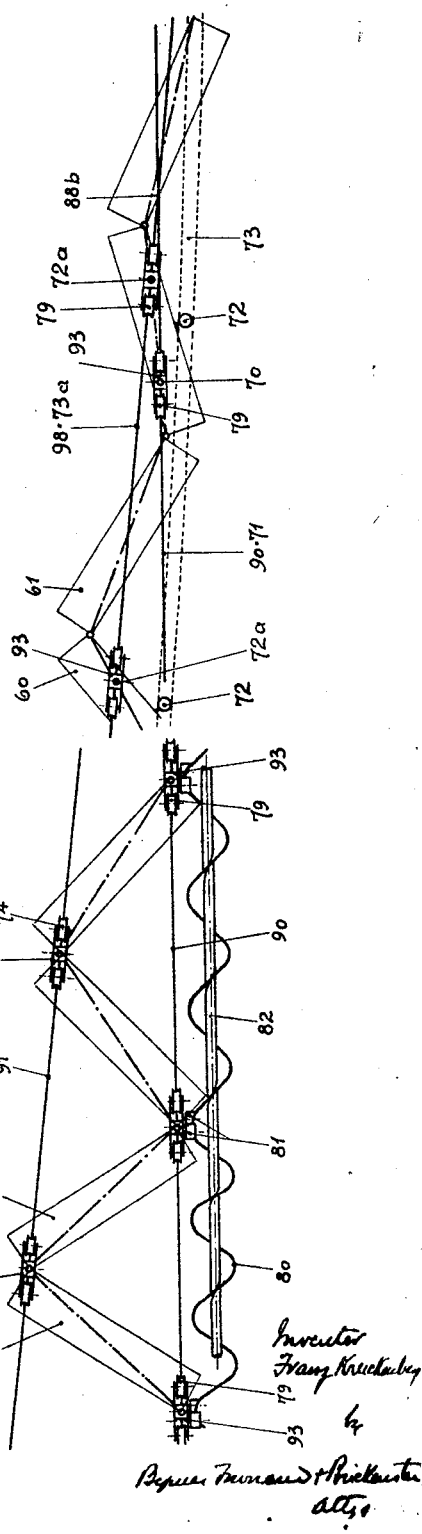

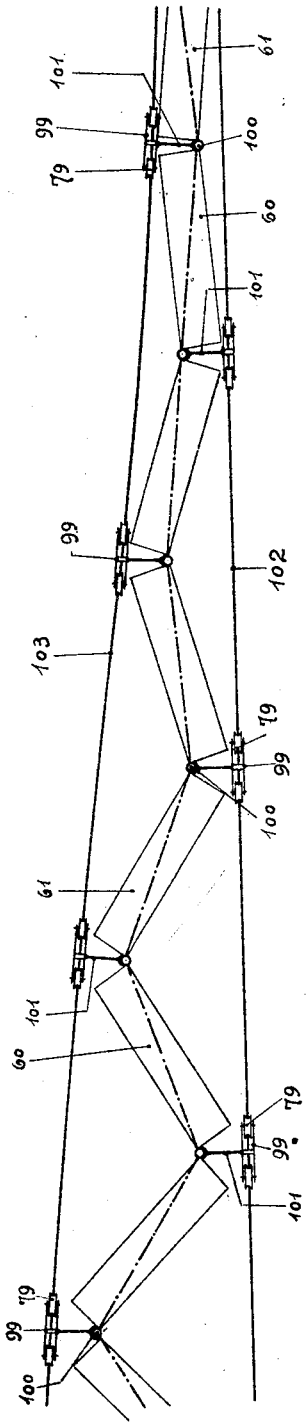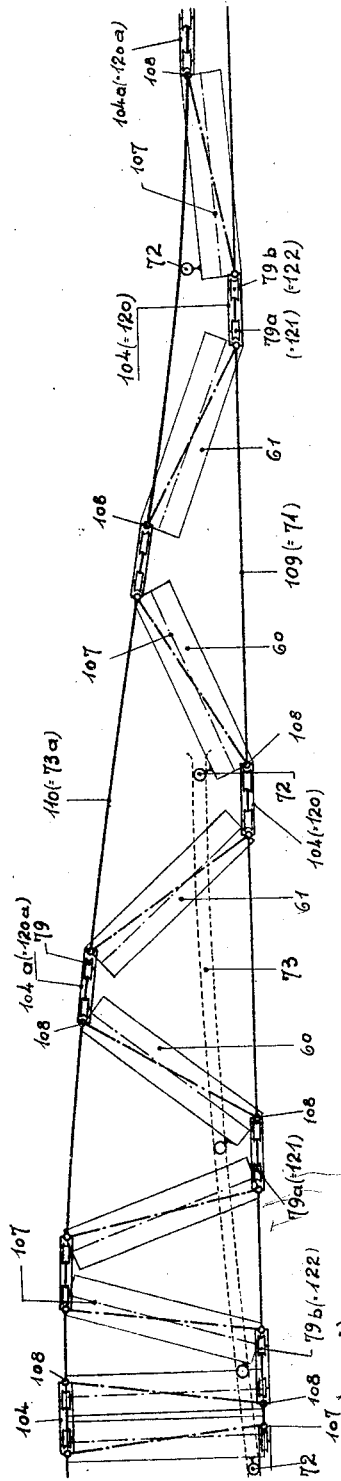

Aug. 20, 1929.  F. KRUCKENBERG  1,725,653
ARRANGEMENT FOR THE INTENSE TRANSPORTATION OF PERSONS
Filed June 3, 1927  13 Sheets-Sheet 8
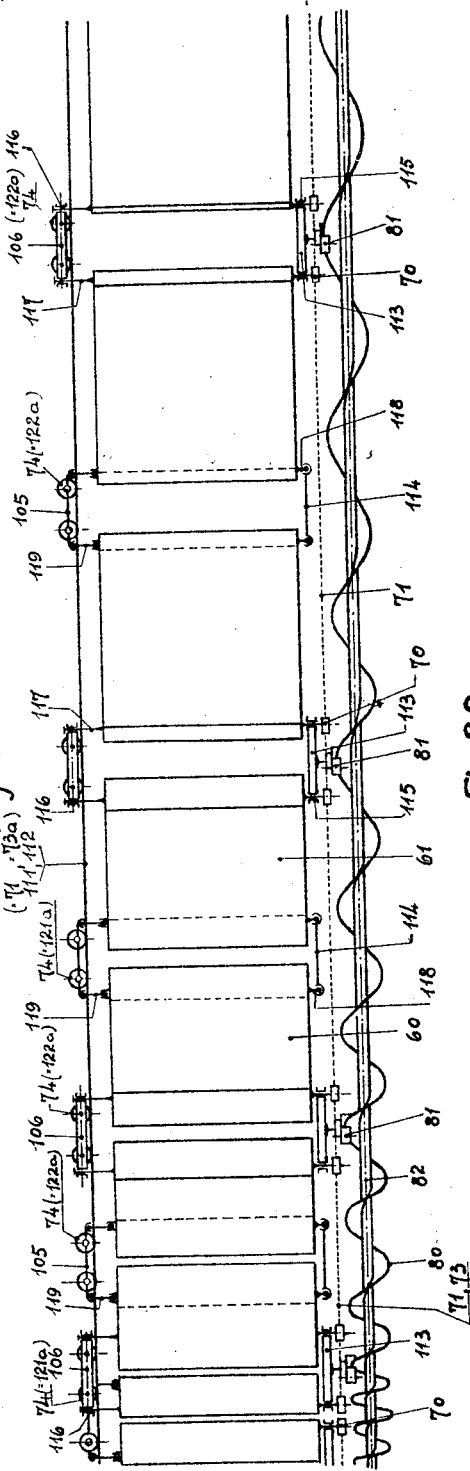
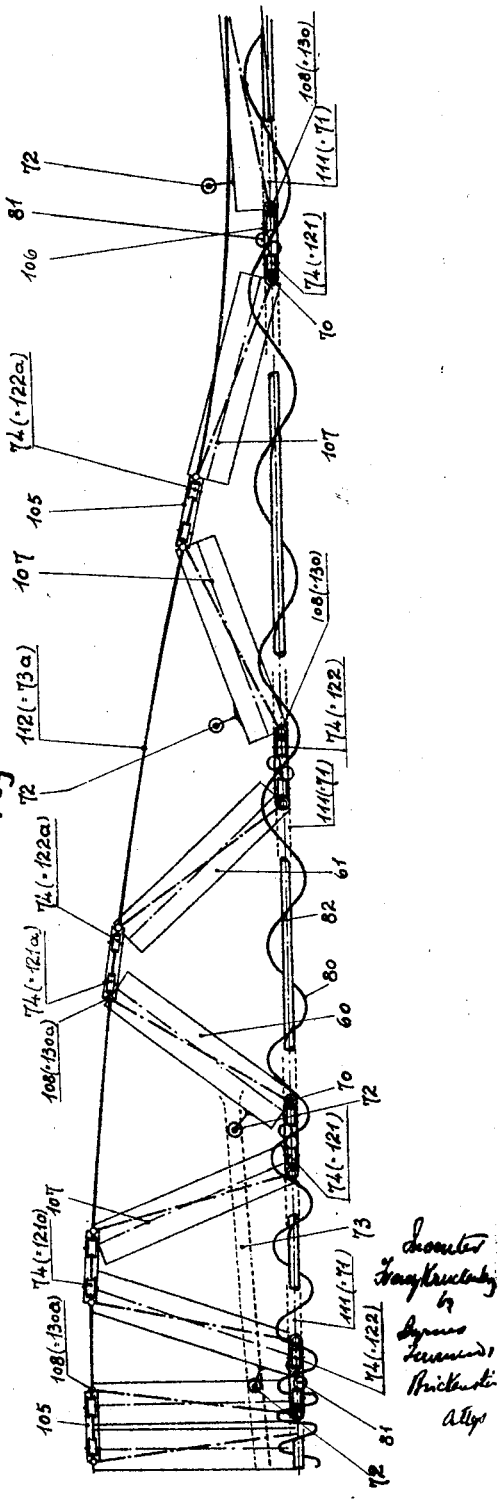

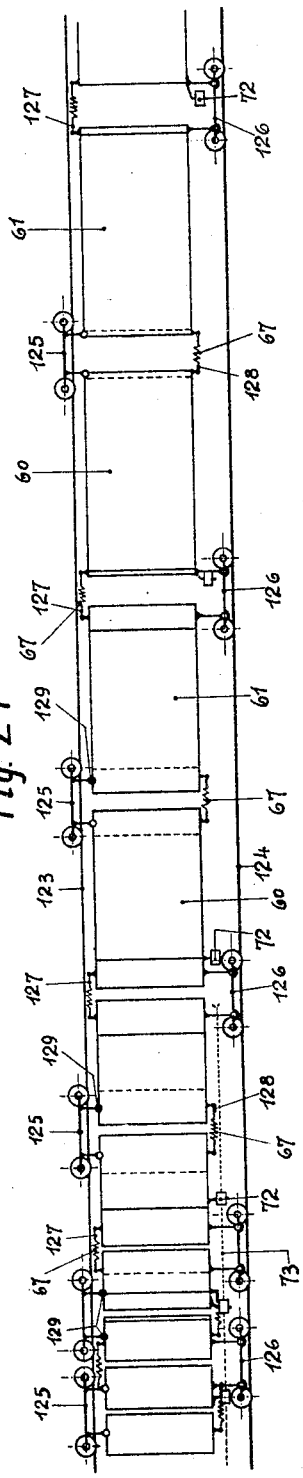
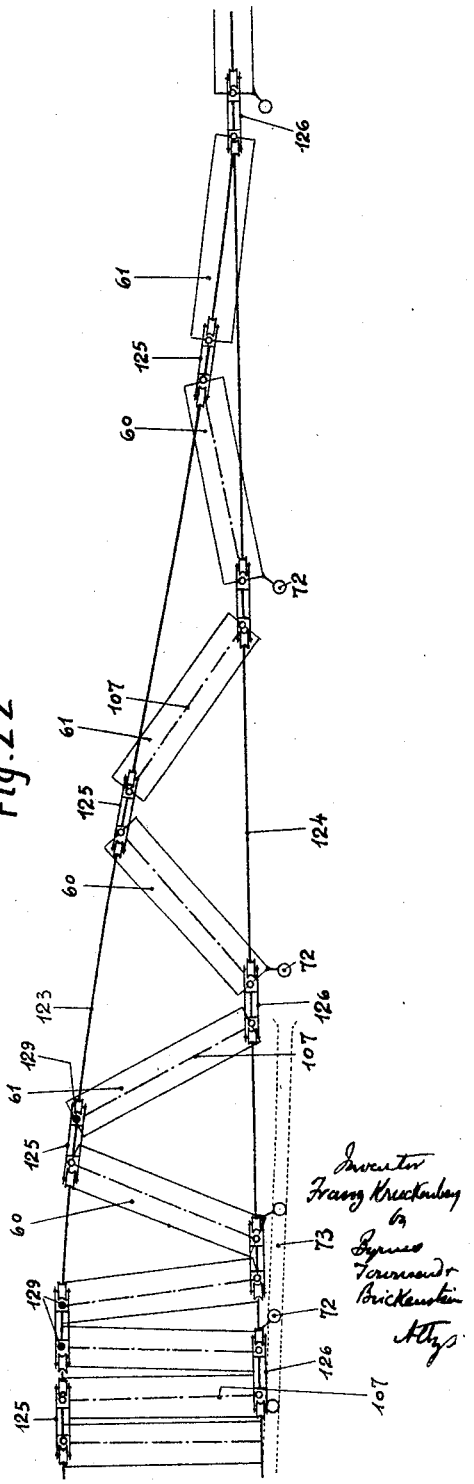

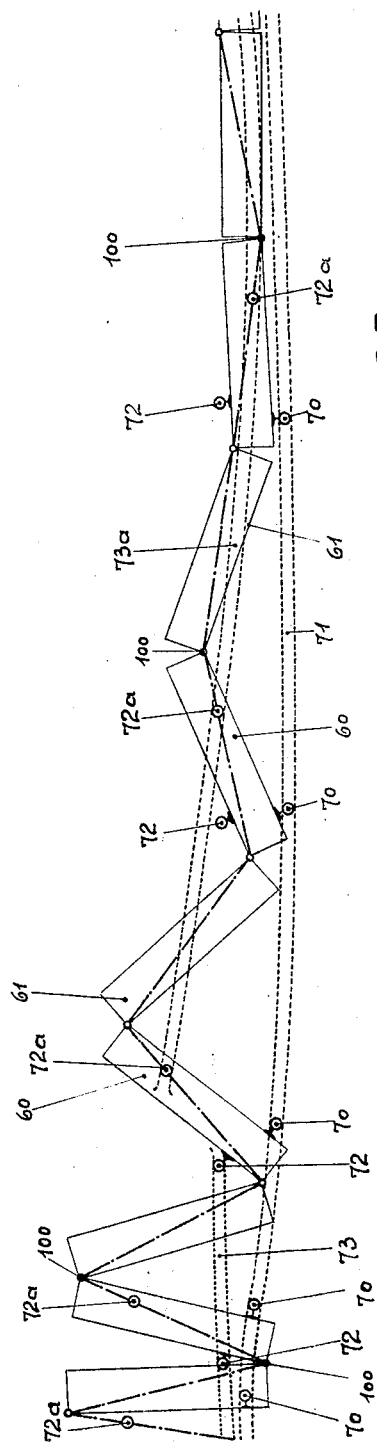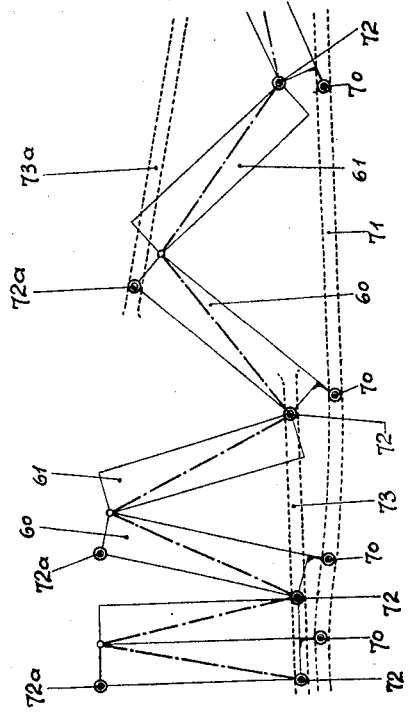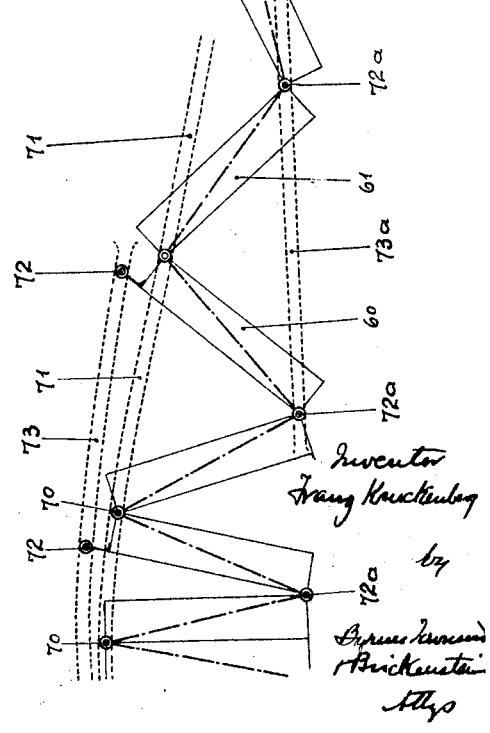

Aug. 20, 1929.   F. KRUCKENBERG   1,725,653
ARRANGEMENT FOR THE INTENSE TRANSPORTATION OF PERSONS
Filed June 3, 1927   13 Sheets-Sheet 11
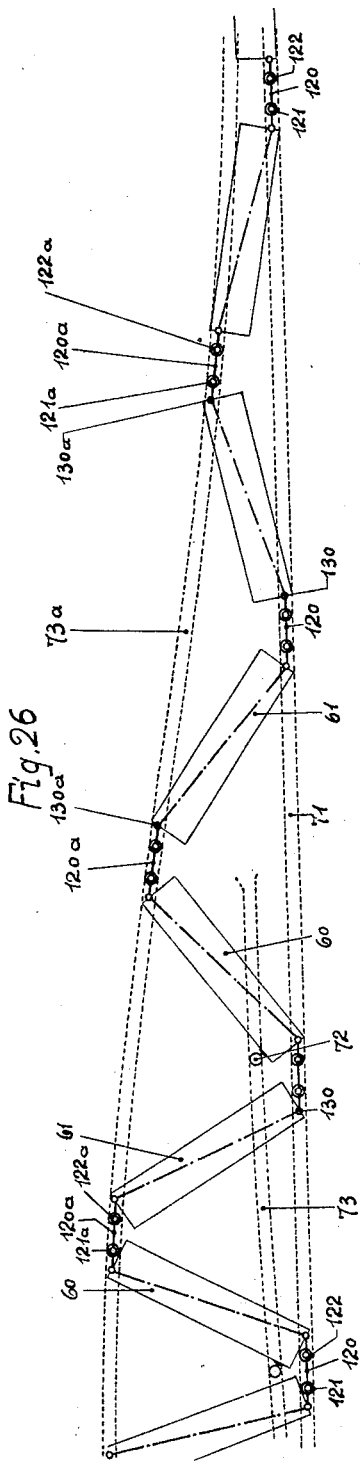
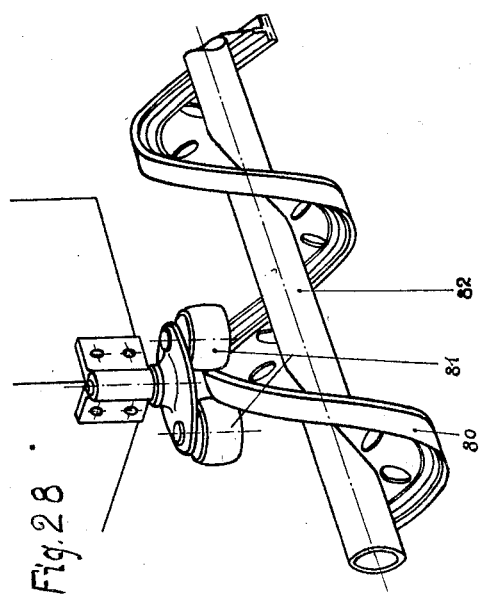
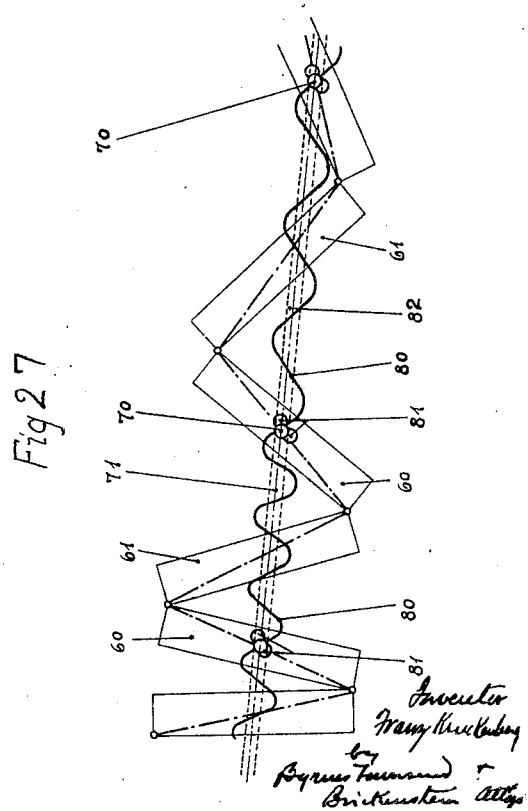

Aug. 20, 1929.   F. KRUCKENBERG   1,725,653
ARRANGEMENT FOR THE INTENSE TRANSPORTATION OF PERSONS
Filed June 3, 1927   13 Sheets-Sheet 12

Aug. 20, 1929.  F. KRUCKENBERG  1,725,653
ARRANGEMENT FOR THE INTENSE TRANSPORTATION OF PERSONS
Filed June 3, 1927  13 Sheets-Sheet 13

Patented Aug. 20, 1929.

1,725,653

UNITED STATES PATENT OFFICE.

FRANZ KRUCKENBERG, OF HEIDELBERG, GERMANY.

ARRANGEMENT FOR THE INTENSE TRANSPORTATION OF PERSONS.

Application filed June 3, 1927, Serial No. 196,350, and in France June 3, 1926.

This invention relates to the rapid transportation of persons: more especially, it relates to railways for the uninterrupted conveyance of big numbers of passengers, as described and shown in the United States Patent No. 1,603,475. The object of the present improvement is to present improved facilities for the operation of those railways in which the speed of progression changes in the (as called in the above-cited patent): "feeder-bands." Such feeder-bands which consist each of a chain of cars with positive change of speed can be utilized not only as an auxiliary railway for conveying passengers to a main railway running continually with highest speed, but can be used also separately, and constitute a material progress over the means tried hitherto for answering the requirements of very intense traffic.

In this way the moving pavement of the Paris Exhibition of 1900 has been repeatedly proposed up to the most recent times as an underground or surface railway in a series of steps or stages. Its disadvantages lie in the limited maximum speed which can be obtained with a permissible number of stages, that is the permissible constructional breadth; and further in the danger during crowding of the falling of passengers forced onto the boundary line of the stage. In order to prevent this either a very low traffic density on the stages or only very small speed difference between the stages, can be allowed. On these grounds the load capacity and speed in relation to the necessary surface are, in such a stage railway for a large town, so insufficient, that in particular for above or below ground construction, there would be no improvement. Another solution has been sought in the "never stop railway" of the Wembley Exhibition, 1924. In this railway passenger carriages are moved continuously without completely stopping on a closed rail circuit, by means of a screw of varying pitch, rotating between the rails. At the station the speed of the coaches is sufficiently low for them to be entered or left, and the coaches there pass one behind the other without intermediate spaces, so that the passenger at no time has to wait for an approaching train. The coaches are then accelerated by the increasing pitch of the driving screw underneath and pass with relatively increased speed at corresponding distances apart until in the neighbourhood of the next station where they are slowed down, that is once again made to approach one another to form an unbroken series. Although it does not afford unbroken access for entering or leaving along the whole line, the "never stop railway" has the advantage over the moving pavement, of enabling a high speed to be attained without increase in width of the way (and with complete safety of passengers with dense traffic). But the load capacity in relation to the necessary surface area is not better than with above and below ground railways with the rapid train sequence at present attained. The Wembley railway travelled in the stations with a speed of about 1½ km./hour=5/12 metres/sec.=25 metres/min.; between the stations with a maximum speed of about 29 km./hour=8 metres/sec. approximately; if the coaches follow in unbroken succession at the stations, their relative separation at full speed is $8 : \frac{5}{12} = 19\frac{1}{5}$ coach lengths, the space between at this time therefore being 19 coach lengths, and the track lengths therefore less efficiently employed than with existing town railways. If for example 15 metres long underground railway coaches were operated on the "never stop" system then in 1½ minutes a station could be passed by $$\frac{1\frac{1}{2} \text{ min.} \times 25 \text{ metres/min.}}{15 \text{ metres/coach}} = 2\frac{1}{2}$$

coaches.

At present, however, normal underground trains of six 15 metre coaches are allowed to pass every minute, that is it has a $1\frac{1}{2}/1 \times 6/4 = 2\frac{1}{4}$ fold load capacity and also reaches a speed of 50 km./hour. The "never stop" system can indeed reach this speed, but to make it possible to enter and leave the coaches they must not exceed a speed of about one metre/sec.=60 metres/min. in the stations, that is, the capacity cannot be increased over $$\frac{1 \text{ min.} \times 60 \text{ metres/min.}}{15 \text{ metres/coach}} = 4$$

15 metre coaches per minute.

Now, to disclose the progress constituted by the present invention, the fundamental characteristics of which are covered by the above-named patent, we repeat here the gist thereof for the sake of clearness. The conveying means are constituted by cars running on rails and forming an endless chain, as do the rails also. The cars passing through stations do not stop at the platforms but pass by along them with a speed corresponding to walking speed, that is to say, with a speed of at the highest 1m./sec. so that persons can step into the cars, and leave them, without any danger. If the desired maximum speed between the stations amounts, for example, to 12 m./sec., that is 43,2 km./h., the cars, on their way from one station to the next, must first be accelerated from 1 m./sec. to 12 m./sec. and then retarded from this speed to 1 m./sec. Now, the cars are as many times longer than their breadth as their maximum speed is greater than their minimum speed. If the speeds are those mentioned above by way of example and the breadth of a car is =1,25 m., its length will be 15 m. These cars are moved not only in their longitudinal direction, but also at right angles thereto, in that they are turned as on a horizontally moving vertical axis while running from station to station. When passing through a station, along the platform thereof, the cars are located at right angles with respect to the direction of the rails, and the passengers step into the cars, and leave them, at one of the front ends of each car, as already stated. Between the stations, however, the cars run on the rails in the normal manner.

If those parts of the line that lie in stations, as well as the line parts between the stations, shall be utilized fully to their utmost capacity, the cars must follow one another continually and their positions at the stations, on the full-speed parts of the line, and between these parts and the stations or platforms, where the cars are turned horizontally by 90° change, as explained. The capacity of an endless railway of this kind is highest if the relation between the breadth and the length of a car is that above stated, as in this case no unduly large gaps need remain between the frontal ends of the cars between the stations, whereas gaps of undesired width arise if the breadth of the car is larger than response to that proportion, and the reverse is the case if the breadth of the cars is smaller.

The improvement in load capacity of this system is shown by a numerical example. If the speed in the stations is 1 metre/sec.=60 metres/min., at full speed 12 metres/sec.= 43,2 km./hour, the coach length 15 metres, the coach breadth 15/12=1.25 metres, then in one minute each station is passed by 60/1.25=48 coaches. Underground railway coaches at present have a length of 15 metres, and are 2 to 2.8 metres broad, that is on an average twice as broad as the swinging coaches here assumed. In load capacity therefore two swinging coaches are about equal to one underground railway coach. The present swinging railway carries in one minute on a single road therefore, the same load as 24 underground railway coaches, and replaces in consequence 4 underground railway tracks having a one minute service of six coach trains. At the same time the long section between the stations, only requires a profile half the width of a single underground railway, that is only ½ of the profile magnitude of an underground system of equal capacity. At the stations it is true the swinging railway requires a breadth of 15 metres as against 4×2.5=10 metres of the equivalent underground railway, but the stations are much shorter in the swinging railway, since the swinging railway permits an unbroken stream of pasengers to pass through the doorways. For example a six coach underground train of 90 metres length not stopping in precisely the same position every time requires a platform length of 100 metres and a stopping time of 20 seconds. The same capacity is possessed by 12 swinging railway coaches each of 1.25 metres, that is a total breadth of 16 metres, which should sweep the platform for common entrance and exit with the twelve doors over its breadth likewise for 20 seconds. In this time the train moves forward 20 metres, and the platform therefore need only be 20 metres long for each door similarly to afford 20 seconds for the passages in and out. If therefore the single side platform is made only 30 metres long, that is, 3/10 as long as that for the underground railways, it safely affords the same loading and unloading convenience. Since the coaches travel by in unbroken succession, the passengers do not need to collect on the platform and this therefore need not be particularly deep. The conditions are very much better still if, as above mentioned, platforms are arranged on opposite sides for separate entrance and exit.

It is, of course, possible to let the cars or coaches run with spaces between them between the stations. This can be effected by designing only every second member of a chain as car or coach, and inserting between these cars or coaches (which are now separated from one another by long gaps) links which in the stations lie between the closely seried coaches without appreciable space requirement. The speed ratio with coaches of the above dimensions on this system would no longer be 12:1 that is with a station speed of 1 metre/sec. a maximum speed of 24 metres/sec. could be attained, or with a lowest speed of ⅔ metres/sec. as in the Wembley railway a highest speed or 16 metres/sec.= 57.6 km./hour.

The above described railway system reaches its highest load capacity when it is used as a transfer means for a continuously running high speed transport system. This is described and shown in the United States patent mentioned in which this swinging railway serves therefore to take up the passengers at the individual stations and to transfer them to the continuous high speed line, and on the other hand to provide a means for transferring passengers from the continuous high speed line to the stations. For passing between the transfer railway and the continuous high speed line, naturally the former must run over a certain section on the same level and at the same speed close beside the continuous high speed line. There are shown and described in the said patent some examples embodying the above disclosed principle. The improved carrying capacity will be shown here by way of one example. The transfer coaches are emptied and refilled at each station, and therefore only need convenient standing room, for which a breadth of 0.83 metres suffices. This gives with a 1 metre sec. speed in the stations and 12 metres/sec. in the transfer sections for the continuous high speed line, a coach length of $12 \times 0.83 = 10$ metres approximately. If the average journey of the passenger is five stations, the continuous high speed line must have a carrying capacity of four times that of the transfer service, that is the coaches must have a breadth at least four times that of the transfer coaches. With a safety excess for the stream of transferred passengers, it may be $5 \times 0.83 = 4.15$ metres broad that is about double the size of an average underground railway coach of 2.25 metres breadth. In one minute any point in the system is passed in one direction by $12 \times 60 = 720$ metres of coach length, which would equal 1440 metres length of underground railway coaches of half the breadth. The above continuous high speed railway with the swinging transfer railway replaces in all $1440/90 = 16$ underground railway tracks in each direction with a one minute service of 90 metre long trains. If only 0.5 metres space is allowed between the parallel running underground railway coach trains, 16 parallel tracks take a space of $16 \times 2.75 = 44$ metres. The continuous and transfer line system as against this in the sections between the stations need only about $(4.5 + 0.83) + 1.17 = 6.5$ metres, which gradually broadens out at the stations to $(4.5 + 10) + 1.5 = 16$ metres. At the same time the transfer system at each station, with a speed of 1 metre/sec. would be traversed each minute by $60/0.83 = 72$ transfer coaches of 10 metres long. The capacity of the 0.83 metres broad transfer coaches is $0.83/2.25 = 3/8$ approximately of that of an underground railway coach of the same length. Each station therefore has a capacity per minute of $72 \times 10 \times 3/8 = 270$ metres length of underground railway trains in each direction, and the system is equivalent therefore to an underground railway in which three empty six coach trains of 90 metres length are provided at each station in each direction every minute, each station therefore dealing with 100,000 passengers per hour. The peculiar conditions, as regards the movements of the coaches or cars employed in connection with the present railway system require particular solutions of the problems connected with the carrying and the controlling members, as well as with the driving gears.

Figure 2:
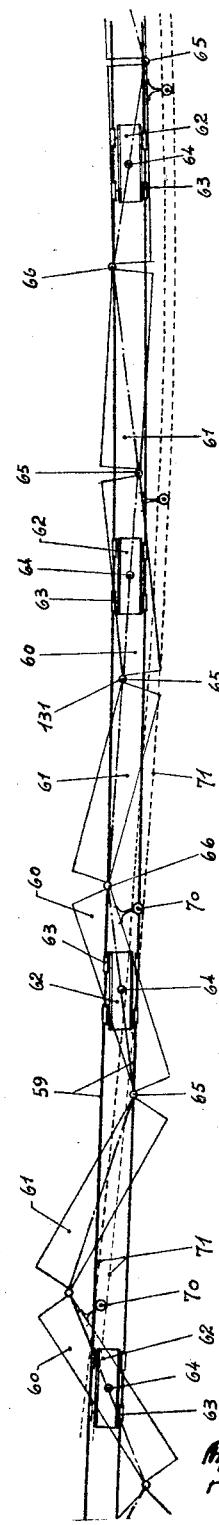

These improvements are illustrated diagramatically and by way of example on the accompanying drawings on which Figure 1 is a side-view and Figure 2 a plan of one constructional form of a railway designed according to this invention; Figures 3 and 4, 5 and 6, 7 and 8, 9 and 10, 11 and 12, 13 and 14, 15 and 16, 17–27, 29–33 show modifications, whereas Figures 28 and 34 show details, all as fully described hereinafter.

The usual railways can employ two parallel fixed rails both for supporting the weight and for guiding the movement of the coach through flanged wheels, since all coaches always remain with their longitudinal axes in the direction of travel. If the present system is to be supported, as Figures 1 (elevation) and 2 (plan) show, by such a parallel rail track 59 and running gears 62 each with four flanged wheels 63, then the coach bodies (60 and 61) must be freely rotatable on the running gears 62 about pins 64, and their movement in respect to the running gears must be controlled by special members, here the guiding rollers 70 and guiding rails 71. It will be seen that the essence of technically usable solutions lies in employing as small a number as possible of supporting and guiding members and where possible of driving members, of which the paths cross as little as possible. Since each kind of supporting member can be employed in conjunction with several kinds of motion guidance and of drive, for the purpose of obtaining a clear view at first only the constructional possibilities of the supporting members will be considered in turn, while the motion guiding members and driving method shown in the same drawings will be considered later.

The supporting track with two parallel rails according to Figures 1 and 2 gives the possibility of simple lateral guidance through the flanged wheels 63. It has the disadvantage however, of poor longitudinal and lateral stability of the coach particularly with the folding arrangement of the coaches according to Figure 2 of the Patent 1,603,475, on which Figures 1 and 2 are based, as only coaches 60 which turn in the same direction can be provided with running gears 62, while the coaches 61 turning in the opposite direction must be suspended between them by links 65. With the displacement system of Figure 1 of the Patent 1,603,475 each coach could have its own running gear, but a gapless cross arrangement of the coach bodies in the station, Figure 1 of the Patent 1,603,475 would necessitate a limited wheel base rendering practical construction impossible. Sufficient longitudinal stability of the coach, which depends on the wheel position, can only be obtained by hinge couplings 65 of the coach edges above and below to form a chain of coaches able to resist bending in a vertical direction. Obviously the chain must also be provided with link points which can be formed as in Figure 1 as ball joints 66 and spring couplings 67, so that the coach train has sufficient give in passing over varying slopes, that is over curves in the vertical plane. For this reason the supporting pins 66 must also be in the form of spherical joint pins. The horizontal links according to the drawing are located between groups of three coaches. Since the running gears are yieldably sprung against the coaches, it can be assumed that each running gear will carry the weight of about two coaches, although the link beam system is statically indeterminate. A statically determinate link arrangement is later described with reference to Figure 5. Since the wheel base of the running gear is so limited, the breadth across the flanges also can only be small if the running gear is not to go out of alignment sideways. This limited breadth over the flanges entails insufficient lateral stability of the train even if the coach bodies are laterally supported on the running gears 62 as in ordinary trains. This lateral stability can be considerably improved, however, if the guide rollers 70 and rails 71 are located vertically as far as possible from the supporting rails 59, in this case therefore right at the top of the coaches.

The conditions remain in general the same if instead of a standing running gear 62 similar suspension running gear on a suspension rail lying above are used and then naturally the guiding rollers 70 and rails 71 are located below.

Figure 3:
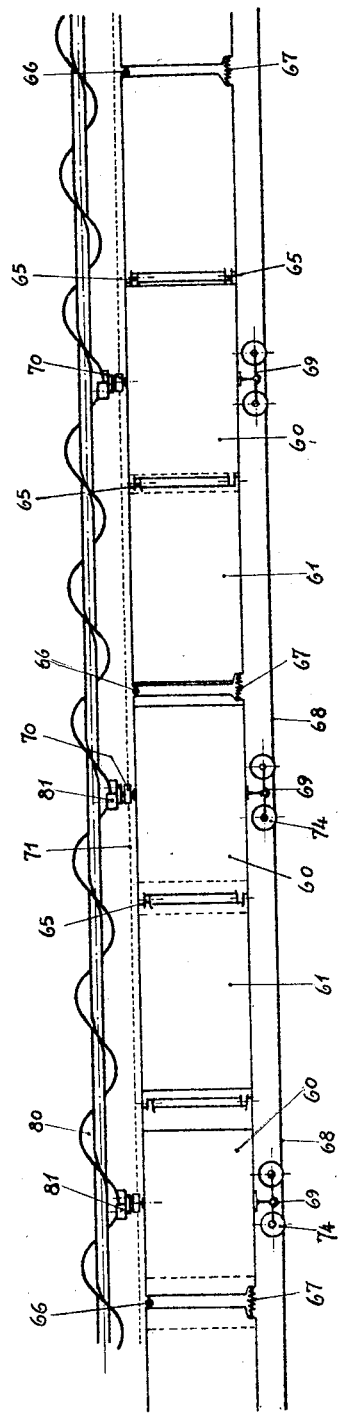
Figure 4:
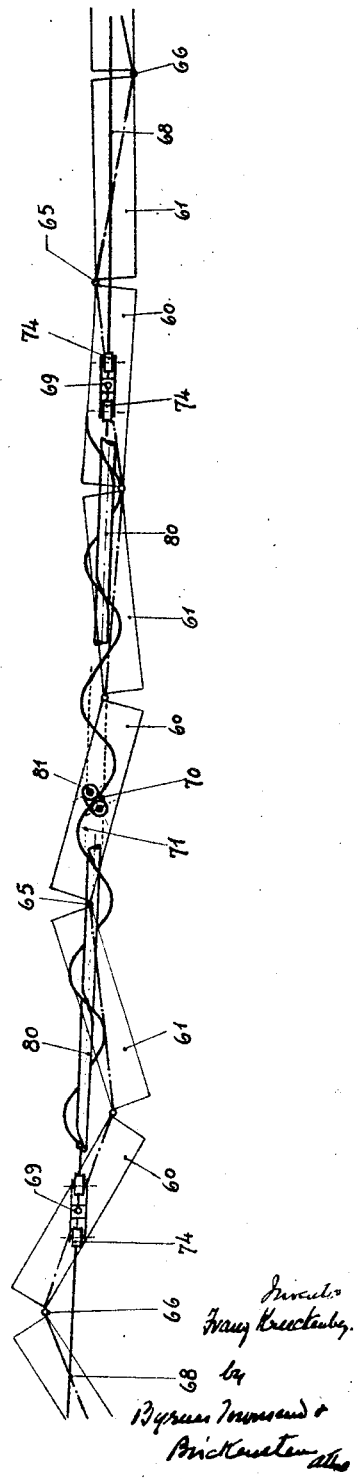

Single rail supporting roads according to Figure 3 have over the double rail roads of Figures 1 and 2 the advantage of simpler tracks and running gears, while the longitudinal stability is no worse, although the small self lateral stability of the running gear due to the width across the flanges completely disappears. Figures 3 and 4 (elevation and plan) show single rail standing arrangements with a rail 68 located below and two wheeled running gears 69 which are only provided beneath the centres of coaches 60 which turn in the same direction, while those 61 turning in the opposite direction are suspended between them. Naturally the single rail wheels 74 must have flanges on both sides for guiding. The coach bodies 60 are supported on the running gears 69 by ball supports and also as before each three coaches are coupled for the purpose of longitudinal stability by hinge links 65 above and below, while between each group of three coaches ball links 66 and spring links 67 are connected above and below (or vice versa) in order to allow varying slopes to be traversed without straining the coach connections. The lateral stability is once more obtained by the guiding rollers 70 and rails 71 lying above, over which a special arrangement with a helical thread 80 engages with rollers 81.

Figures 5 and 6 (elevation and plan) show single rail suspension arrangements with a rail 75 at the top and two wheeled suspension running gears 76, arranged in general similarly to the coach chain described with reference to Figures 3 and 4. It differs from this earlier one as shown in Figure 4 in that there is between each three coach train with two running gears and the next train a connecting link 61$^a$ or coach body 61$^b$ with ball joint connections 66 at each end. In this way the coach chain is broken up into a succession of statically determinate beams (each comprising the coaches 60, 61, 60 supported by two running gears 76. For lateral stability it is again necessary that the guide rollers 70, 72 be located as far as possible vertically from the supporting rail 75, here as shown in the drawing, below.

Figure 7:
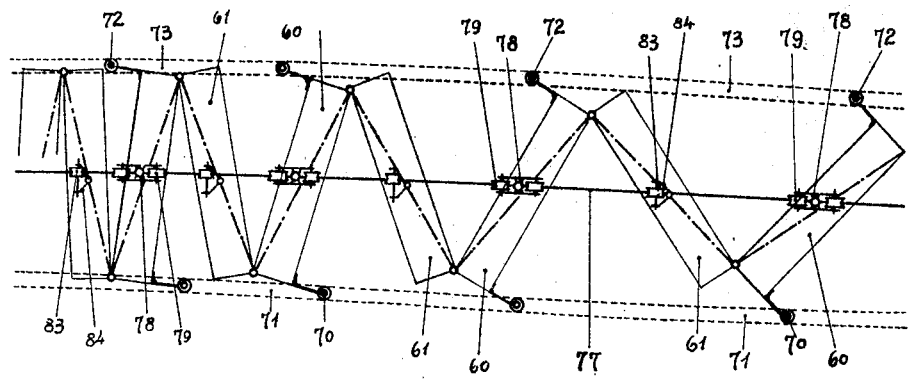

In Figure 7 (plan) is shown how a single supporting rail 77 above or below can support not only the coaches 60 turning in one direction, but also the intermediate coaches 61 turning in the opposite direction, in order to reduce the loads on the individual running wheels and the vertical bending moment in the three coach train. If a running gear 78 with two flanged wheels 79 is used under the centre of each coach 60 to allow for gapless cross positioning in the station, only a single wheel 83 can be used under the centre of each coach 61. Owing to the opposite swing of the coaches 60 and 61, this wheel does not take the same path as the running gear 76 under coach 60, see Figure 6, and in consequence the wheel 83 must either be very broad and without flanges, or as shown it can be a flanged wheel adapted to move a considerable distance axially, and to act as a castor wheel in the fork 84.

Figure 8:
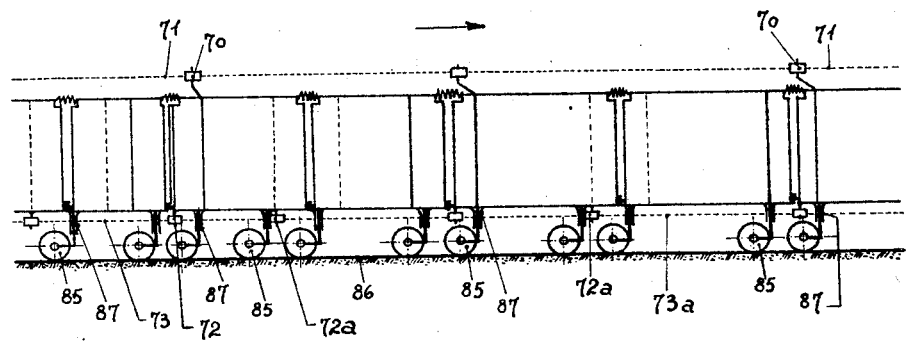
Figure 9:
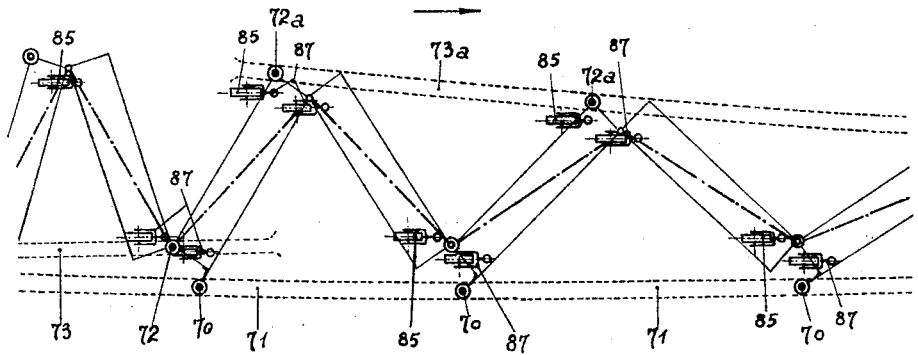

Entirely railless support of the coaches by a smooth floor way 86 is shown in Figures 8 and 9 (elevation and plan). Here each coach can be provided at suitable points with carrying wheels in the form of self adjusting rollers 85 in fork carriers 87, since there are no restricted paths. If they are located, as shown, at diagonally opposite corners of the coaches, they give the train of coaches a compartively high degree of longitudinal and lateral stability. The latter, as before, is only completely ensured, however, by the guiding rollers 70 engaging the guiding rails 71, which for this purpose are located as far as possible vertically from the supporting running gears 85, that is at the top of the coaches. By means of ball and yielding connections 66 and 67 the coaches can be coupled relatively movable to one another. Finally, the arrangement of Figure 2 with a rolling connection between the running gear 62 and the body 60 can be used with a railless running path.

Two rails running at an angle to one another, Figures 10 to 22, provide the same supporting stability as the railless form of Figures 8 and 9 and can be carried out in many ways.

Figure 10:
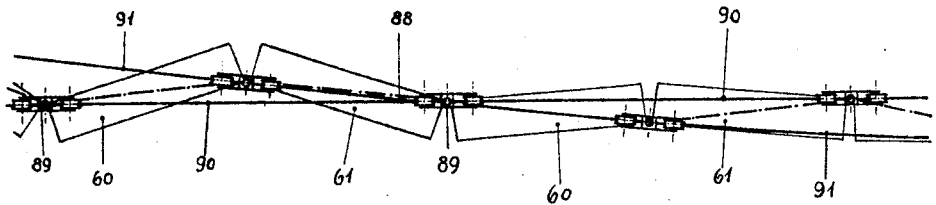
Figure 11:
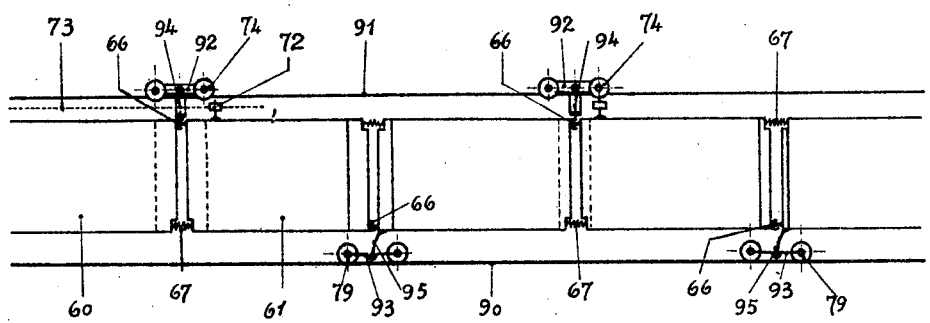
Figure 12:
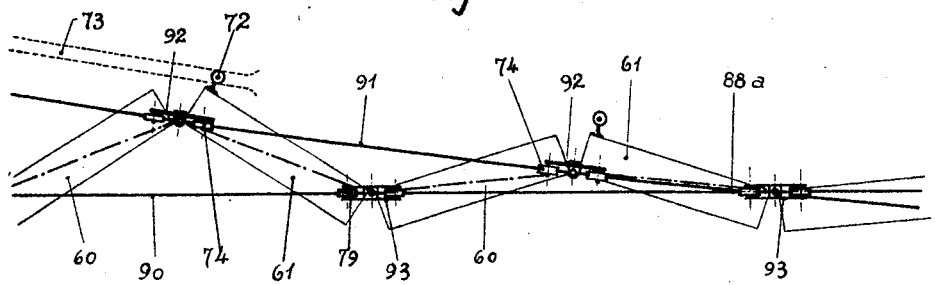

Two rails 90 and 91 with a crossing in plan at 88 are shown in Figure 10. The supporting points 89 of the running gears are here shown at the abutting edges of the coaches where the coaches 60 and 61 are coupled to one another by joints or hinges to form a chain on the folding system. It will be seen that in this case in order to obtain a swing of the coach through a full 90° angle from the cross position to the longitudinal position, a crossing of the rails in plan is necessary. The crossing of the rails need not nevertheless be in the same plane. In Figures 11 and 12 (elevation and plan) the running gears are located alternately above and below, above as suspension running gears 92, each with two double flanged wheels 74 running on a rail 91, below as standing running gears 93 each with two double flanged wheels 79 on a rail 90. For connecting the coaches 60 and 61 with one another, ball joints 66 and spring couplings 67 are provided alternately above and below at the supporting joints, Figure 11. While, however, the arms 94 of the suspension running gears 92 at the top can be joined directly to the ball member 66 itself, the arms 95 of the standing running gears 93 below the lower ball joints 66 must be rigidly fastened to one of the coach edges, as otherwise they would tilt over. As can be seen the coach train can yield in all directions with varying slopes of the sections, while complete longitudinal stability is ensured without the use of the guiding members. This is a notable advantage of this arrangement and, apart from the guiding members, this applies in general to the arrangement of Figures 13 and 14 (elevation and plan). In the latter arrangement, in Figure 13, to connect the coaches at each suspension running gear 92 is an arm 94 with a ball joint 66 at the top, and below is a yielding link 67, while at the standing running gears both below and above, hinge connections 65 adapted to resist vertical bending moments connect the coach 60 with the coach 61 to form a beam able to resist vertical bending action. The guiding members 80—82 and 96, 97, are described later.

In Figures 15 and 16 (elevation and plan) both supporting rails 90 and 98 are on the ground and actually cross at the point 88ᵇ, which although it involves noise and wear, results in no danger in operation, since a crossing of the rails on the ground only involves comparatively small breaks. Under each coach 60 turning in the one direction are located two supporting trucks 93 each with two double flanged wheels 79. The coaches 60 and 61 are connected by hinges yieldable in all directions, that is in each case a positive ball joint 66 and a yielding link 67; as shown, all the ball joints 66 can be at the top and all the yielding links 67 at the bottom, or they may be arranged vice versa, or in alternating succession. The longitudinal stability of the coaches is good, the lateral stability is only ensured by the guiding members, rollers 72 and rails 73, which for this purpose lie as far as possible vertically from the supporting running gears 93, that is, at the top of the coaches.

Figures 17 to 22 show two rails not crossing in plan.

According to Figure 17 (plan) the running gears 99 are connected to the joint spindles 100 of the coach chain in a moment resisting manner by outriggers 101 the spindle 101 itself only being secured to one coach edge, while the connection between the coaches 60 and 61 is effected by ball joints as in Figure 11 at 66. The effect of the outrigger 101 is that the supporting rails 102 and 103 do not cross but at the most only touch. Both rails can in consequence be arranged above as suspension rails, or naturally as in Figures 15 and 16 both below, or one above and one below as in Figures 11 to 14. For this reason no elevation has been shown.

According to Figures 18 (plan) 19 (elevation) and 20 (plan), the running gears 104—106 each with two double flanged wheels 74 or 79 form connecting members for two coaches 60 and 61 and have no outriggers. On the other hand they are attached not to the adjacent points of the neighbouring coaches but are attached to and turn about the points 108 on the other sides of their longitudinal axes 107, so that in this way crossing of the rails 102—103 is avoided. In Figure 18 all the running gears 104 and 104ᵃ and both supporting rails 109 and 110 are to be assumed as lying underneath. The double flanged wheels 79 together with the guiding rollers 72 and rails 73 assumed above, ensure lateral stability. In Figures 19 and 20 on the other hand, both supporting rails 111 and 112 as well as the running gears 105 and 106 with double flanged wheels 74 are shown above, the laterally stabilizing guiding rollers 70 and rails 71 being below. Longitudinal stability is in all cases ensured by the running gears 104, 104ᵃ and 105, 106. The form of the connecting joints between the coaches 60 and 61 corresponds in general to the vertical joint system of Figures 13 and 14. Here also, one coach 60 is connected with one 61 by hinge-like connections on the lower connecting member 113 and on the suspension running gear 106, to form a beam able to resist vertical bending moments. This is achieved by sleeve bearings 115 around the spindles of the guide rollers 70 and by sleeve bearings 116 around coach pins 117. With this hinge-like stiff connection alternates a yielding arrangement by means of the connecting members 114 and the running gears 105. Below both ends of the connecting members 114 are connected to the coach pins 118 by ball joints, above the coach ends are suspended by ball jointed links 119 on the running gears 105. In this way the necessary hinging of the coach chain in the vertical plane, that is for varying slopes, is ensured. The connecting members 113 can be combined with the suspension gears 106, and the connecting members 114 with the running gears 105, in each case to form a rigid body.

Figures 21 and 22 (elevation and plan) show an arrangement in which both supporting rails 123, 124, come into vertical alignment in the sections in which the coaches are in relative longitudinal position. The running gears 125 and 126 lie alternately above and below the coaches. The coach connecting members 125, 126, 127 and 128 are coupled at 129 in the centre lines 107 of the coaches, so that in the longitudinal position these centre lines and the connecting members are in a straight line. The unsupported connecting members 127 and 128 are yieldably arranged as indicated by springs 67.

It should be mentioned that crossing of the supporting rails can naturally also be avoided by not proceeding to the fully stretched position, but only up to a point where there is an obtuse angle between their longitudinal axes of the coaches. If such a swinging railway is used as a transfer means for a continuous high speed line (see Figures 1 to 10 of the Patent 1,603,475) then the coach train must have a corresponding zigzag form on the transfer side, so that the transfer coaches can lie alongside without intermediate spaces.

In adidtion to the supporting members described above, as was mentioned, guiding members for effecting the swinging of the coaches are necessary. In many cases this swing guidance or control is effected for example by the already described supporting members, so far as they are formed by laterally guided ribbed or flanged wheels. If, however, the swinging is first considered in essence it will be seen that two laterally guiding members must act, which run at an angle to one another and which act only on coaches swinging in the same direction, or at the connecting point of two coaches swinging in opposite direction or on the connecting member or such a pair of coaches; further, a third member must be provided which for the preservation of the correct distance between two coaches is pivotally interposed and consists either of a rigid body (rod or coach body) or of two or three pivotally jointed bodies, one of the bodies or the joint between two of the bodies being guided. The final aim of the swinging control is to give the guided coach a definite angular position in relation to the axis of the line section at every point.

Various types of the three above mentioned guiding members are shown in diagrammatic plan views in Figures 23 to 33. For clearness the guides are indicated by dotted double lines. They are to be considered say as of U-shaped cross-section in which rollers engage from above or below, the vertical spindles of which are secured to the coaches above or below.

In Figures 23 to 25, 70, 72 and $72^a$ are the guide rollers, 60 and 61 the coaches, 71, 73, and $73^a$ the guide rails, 100 the connections between the coaches 60 and 61. As can be seen, only the coaches swinging in the same direction are controlled laterally by two members 70, 71 and 72, 73, or 76, 71 and $72^a$. The third member for ensuring the correct distance between two successive coaches 60 swinging in the same direction consists of a rod $61^a$ (displacement system) or coach body 61 unguided laterally (folding system). In order to control the swinging movement with accuracy and with a moderate roller pressure, the two rollers for the time being controlling the coach 60 must be as far as possible apart in the direction of the guide rails 71 and 73 or $73^a$, and at the same time as near together as possible in the cross direction. For example, at or near the cross position of the coach, to the left of Figures 23 to 25, the pair of rollers 70 and $72^a$ would be unsuited for control, while in the longitudinal position of the coach, to the right of these figures, control by rollers 70 and 72 would be insufficient; in such cases guiding would not be sufficiently certain and there would be the danger of binding of the coaches. The only way is to effect control in the cross position of the coach by the rollers 70 and 72, in the longitudinal position by the rollers 70 and $72^a$, always in such a manner that at one time only two guides need act simultaneously.

At what positions the guide rollers are advantageously mounted on the coaches, so as to satisfy this basic rule, must be considered after they have been worked in without trouble with the supporting and if possible, driving, members. For example the four complete arrangements of Figures 15, and 16, 7, 5 and 6 and 1 and 2 are carried out on the basis of the general case of Figure 23.

In Figures 15 and 16 the running gear pivots 70 and $72^a$ correspond with the similarly numbered guide rollers of Figure 23 since they are laterally guided by the flanged wheels 72, while the supporting rails 90 and 98 are here at the same time equivalent to the guiding rails 71 and $73^a$. For the section with the coaches in cross position in addition the guiding roller 72 and rail 73, corresponding to those similarly numbered in Figure 23, must be provided. To avoid crossing alone they must be provided above, and they remain in engagement in the sections with the longitudinal position of the coach, but here solely for ensuring lateral stability and not for guiding.

In Figures 7, 5 and 6 and 1 and 2, the guiding members and their function can be recognized by the reference numerals which correspond to those of Figure 23.

In Figures 24 and 25 the guide rollers 70 and 72 and 72ᵃ are located at the ends of the coaches.

The complete arrangements of Figures 11 and 12, and 17, are carried out in accordance with 24 as can be seen from the corresponding reference numerals indicating the guiding members. In these cases the coupling points 70 and 72ᵃ of the coaches are laterally guided by running gears each with two flanged wheels, in Figure 17 through the arm 101, the supporting rails acting at the same time as guide rails.

The guiding of the complete system without supporting rails of Figures 8 and 9 is carried out in accordance with Figure 25. The distribution there of the guiding members at the top and bottom of the coaches avoids crossings and ensures lateral stability.

In Figure 26 the coaches 60 are connected by three bodies 61, 120 and 120ᵃ. In the displacement system the distance member 61 is a rod, in the folding system a coach body. The connecting members 120 and 120ᵃ are each guided by two rollers 121, 122 and 121ᵃ, 122ᵃ, and rails 71 and 73ᵃ. In the section with the coaches in the cross position the coach 60 is guided at the point 130 by the running gear 120 and by the roller 72 and rail 73. In changing from the cross position to the longitudinal position, the roller 72 becomes more and more ineffective, the rail 73 ends and the rail 73ᵃ and the connecting members 120ᵃ take over control.

The complete arrangements of Figures 18 and of 21 and 22, act in accordance with the system of Figure 26. In Figure 18 the running gears 104 correspond to the connecting members 120 and 120ᵃ, of which the two flanged wheels act as the guide rollers 121, 122 and 121ᵃ, 122ᵃ, while the supporting rails 109 and 110 act as the guide rails 71 and 73ᵃ. In Figures 21 and 22 the running gears 125 and 126 correspond to the members 120 and 120ᵃ, and the rails 123 and 124 to the guide rails 73ᵃ and 71.

Figures 27 to 32 show controls using a rotating screw thread, as is known for example from the above mentioned "never stop" railway at Wembley. Such a member, Figure 28, consists of a rotating shaft 82 positioned according to the manner of drive on the ground or on the walls, covers or framework, on which shaft is securely attached a steel band 80 in the form of a cylindrical screw thread similarly to the way in which a corn conveying worm is secured on its shaft. The screw thread form band 80 either has a U profile section with its open side turned outwards, or as shown a simple band profile section. In the former case a roller pivotally carried on the coach body enters between the limbs of the U, in the latter case, as shown, the band is engaged between a pair of rollers 81 pivotally carried on the coach body. The pitch of the screw thread can vary continually along the way, without the engagement of the coach connecting and controlling members.

Figure 29:
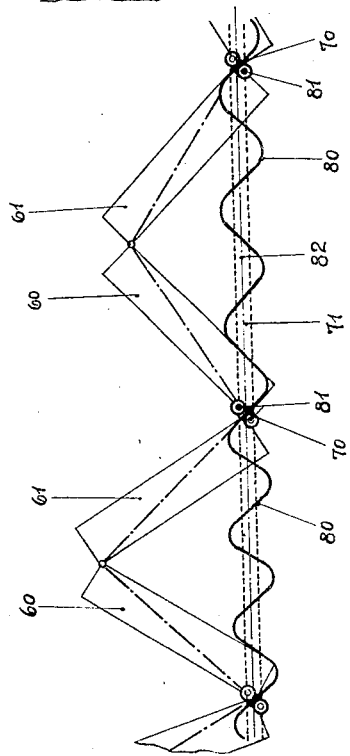
Figure 30:
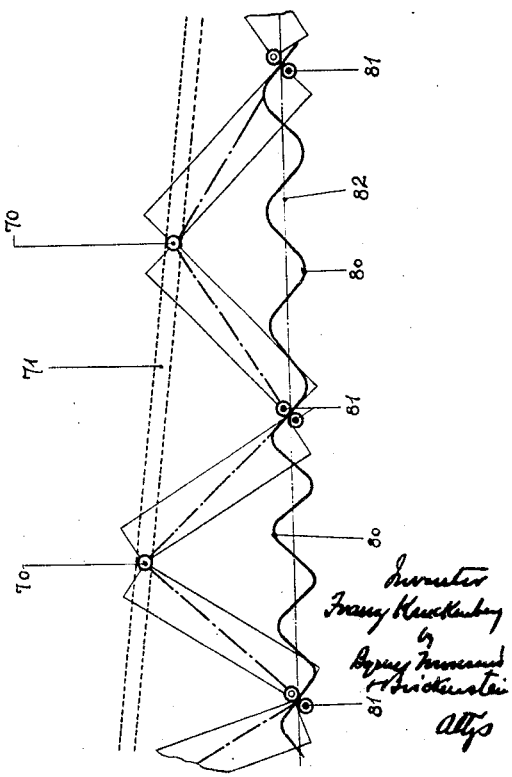

All three control arrangements of Figures 27, 29 and 30 have an indeterminate position in the rail section, when in plan just near the longitudinal position of the coach the force line connecting the coach couplings is straight. In so far as the turning momentum of the coaches may be insufficient to ensure this passing over without trouble, at this point, a short guiding rail for example may be provided which prevents bending the wrong way at the point 131.

The control in the complete arrangement of Figures 3 and 4 is effected according to Figure 27 and that of Figures 13 and 14 according to Figure 29. The control members are correspondingly numbered so that the action will not need further explanation in view of what is stated above. The pressure of the screw 80 on the rollers 81 in Figures 13 and 14 is exerted at the side of the hinge pin 65 and would therefore cause this to turn if this action were not resisted by the flanges of the wheels 79 on the rail 90. If it is desired to avoid noise and wear due to this constant flange friction; then for example, according to Figure 13 this can be effected by the pair of rollers 96 on the hinge spindle 65, which bear against the guide rail 97.

Figure 31:
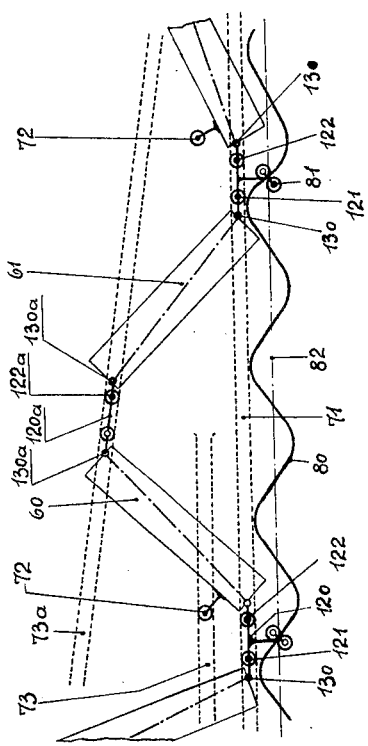

In Figure 31 as in Figure 26, connecting members 120 and 120ᵃ are interposed between the coaches 60 and the connecting rods or coaches 61. These connecting members are guided by rails 71 and 73ᵃ each through two rollers 121, 122 and 121ᵃ and 122ᵃ, and themselves regulate the movement of the coaches 60 and 61 through the joint points 130 and 130ᵃ. The opposite position of the connecting members 120 is regulated by the screw thread 80 through rollers 81. For complete determination of the movement the rod or coach 61 is superfluous, and this member, if full co-ordination in running is to be obtained, that rollers with the band being affected. The thrust between the roller and screw thread inclined to the rail direction naturally produces a cross component which must be taken by other guiding members, for example in Figures 27 to 30 by the guide rollers 70 and guide rail 71. The rotation of the screw shaft 82 can be effected in various ways. If the swinging coaches move by their own power developed by motors carried by them or if they are driven from the outside only on sections where the speed is uniform (that is only in the sections where they are in full cross or longitudinal position), and on the intermediate sections only drawn forward by the coach couplings, the screw thread 80 can be maintained in rotation by the rollers 81.

In Figures 27 to 32 the rollers 81 are all carried by the coaches 60 with the same direction of swing or at the connecting points of these coaches 60 with those 61 swinging in the opposite direction. It is obvious that by varying the pitch of the screw thread 80 along the section the coach chain can be stretched out to the longitudinal position, and closed together to the cross position in the stations. In contradistinction to the earlier controls of Figures 23 to 26, in Figures 27 to 31 the rollers can to a certain extent replace the three individual control members; here the distance apart of the individual coaches is determined by the screw thread 80, and not by the connecting members (coaches or rods 61, connecting members 120 and 120$^a$); the latter here in common with the third member (70, 71 or 120, 71 and 120$^a$, 173$^a$) only controls the angular position of the coach.

In Figures 27 and 29 the screw rollers 71 are at the ends of the coaches, while the control rollers 70 are not coaxial but at the opposite ends of the coaches. If the transmission of forces is considered, it will be seen that the arrangement of Figure 29 is least sensitive to inaccuracies and play if jerking and binding is to be avoided, must therefore only be suspended with a certain amount of yield in the longitudinal direction. The same effect is achieved with rigid intermediate members 61, if one of the guide rollers 121$^a$, 122$^a$ is omitted at 120$^a$. As shown by Figure 26, in the section with the coaches in the cross position, accurate guiding will not take place without further means; the necessary supplementary guiding is obtained, as in Figure 26, by guide rollers 72 and rail 73. The screw rollers 81 are shown somewhat displaced laterally from the connecting member 120 only for the sake of clearness; in carrying out this arrangement, to avoid twisting movement they would be placed in plan as close as possible to 120.

The control method of Figure 31 is used in the complete arrangement of Figures 19 and 20, which can be understood without further description from the similar reference numbers. Once again the necessity for avoiding crossings with the other control members and with the supporting members is the deciding factor for positioning the screw.

Figure 32:
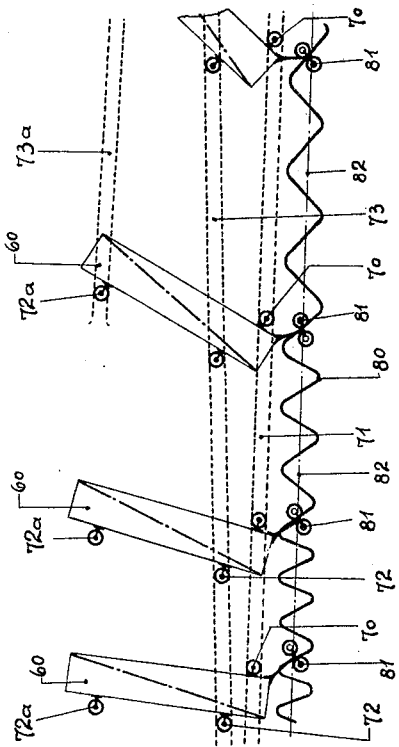

Figure 32 (plan) shows control with one screw 80 and rollers 81, when the coaches are entirely uncoupled with one another, but are controlled by two rollers 70 and 72 or 70 and 72$^a$ by means of rails 71 and 73 or 73$^a$, according to their angular position, in the manner already described. Naturally the guide rollers 70, 72 and 72$^a$ could be otherwise arranged as in the examples described above; a further coach could also be suspended with slight play between two guided coaches 60 (folding system).

According to Figure 32 (plan) the individual coaches can also be controlled by two screws 80 and 80$^a$ and rollers 81 and 81$^a$. The third guide, roller 70 in rail 71, has then only to assume lateral control, while the relative distance apart of the coaches and their angular positions are regulated by the two screws. Naturally, as in the previous examples, the guide rollers 70 could also be located at the ends of the coaches and one or both screws be nearer the centre of the coaches. Further, an additional coach could be suspended with play between two guided coaches 60.

Figure 33:
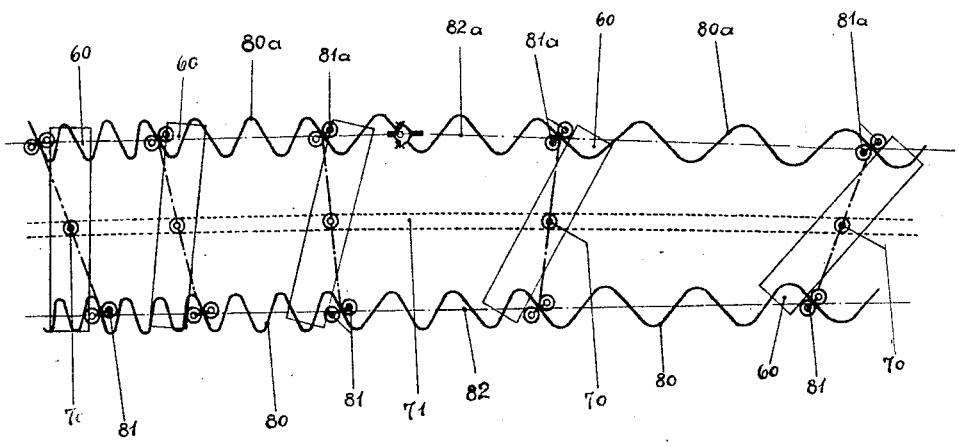
Figure 34:
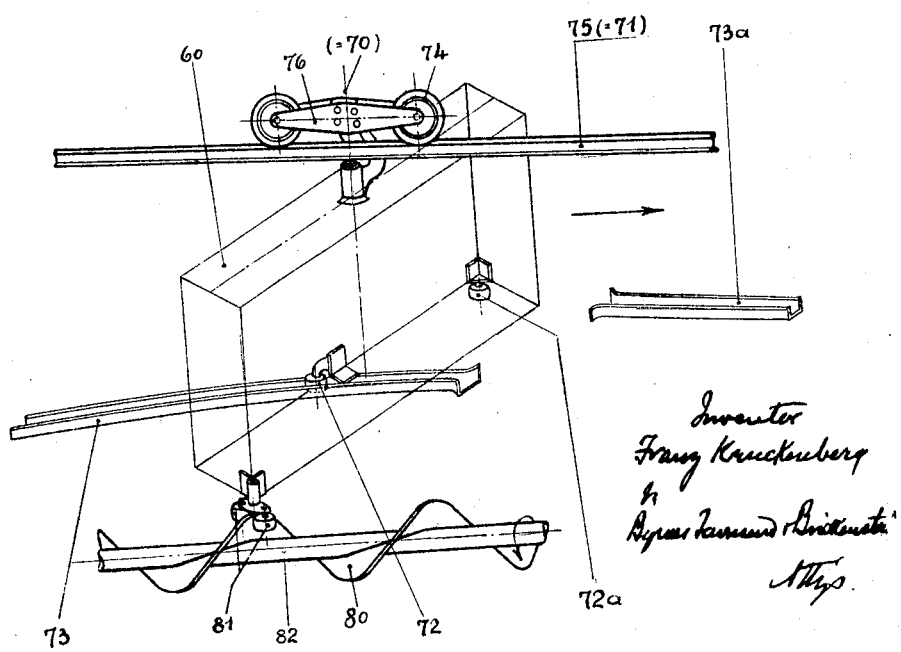

With the individually controlled coaches (displacement system) shown in Figures 32 and 33 provision must be made particularly to prevent cross tilting and swinging of the coach bodies in view of the absence of hinge connections between adjacent coaches. As mentioned above, lateral stability can be effected by guide members advantageously distributed at the top and bottom levels of the coaches. Figure 34 shows by way of example an individually guided coach, the control being basically that of Figure 32 and the supporting method that of Figures 5 and 6. The supporting running gear 76 is located above the centre of gravity of the coach and has two double flanged wheels 74 running on a suspension rail 75. The running gear 76 is connected with coach body in such a manner as to resist moments in the vertical plane, but rotatable in the horizontal plane. Tilting and swinging is resisted by a sufficient wheel base of the running gear 76 and by the guiding members below, namely the guide roller 72 or 72$^a$ in the guide rail 73 or 73$^a$, and the screw rollers 81 on the tread 80.

At various points in the above description the possible methods of driving the swinging railway have been mentioned; either from the train itself by coach motors, or from outside by screw threads of varying pitch. The drive could also be restricted to the sections of constant speed (in the one case with the coaches across and in the other along the track) and be effected by a rope or the like, when the coaches are coupled to form an unbroken train. Where the swinging coach railway is used as a transfer railway the drive can also be effected from the continuous high speed line by the temporary engagement of the swing coaches (in the longitudinal position) therewith.

Equal speeds of the two kinds of railways outside the stations in order to enable the passengers to step over from the one kind to the other one can be brought about either by direct coupling of those cars that run side by side or by synchronizing the speeds mechanically or electrically; and in order to bring the platforms running side by side on a common level, ledges provided at a side of the platforms of the one kind may engage pairs of ledges provided at the opposite side of the platforms of the other kind, and these latter ledges may be supported elastically in such a manner that the platforms running side by side at the time being are practically firmly connected with each other and the passengers can step over from a platform of the one kind to a platform of the other kind far more safely and conveniently than in the present express or corridor railway cars. Finally, means may be provided for opening automatically the car doors when the platforms are so located that the passengers can step over, and for closing the doors automatically when the platforms are again leaving one another.

I claim:

1. A railway of the type including an endless succession of elongated cars continuously moving over a permanent way, and means for turning the cars horizontally to position the ends thereof parallel to the direction of motion (cross position) at sections of the way corresponding to stations and to position the sides of the cars parallel to the direction of motion (longitudinal position) at sections of the way lying between stations, the speed of the individual cars changing as the cars move into and out of a station section and being a minimum in cross position and a maximum in longitudinal position, characterized by the fact that supporting structures and guiding structures are provided along the permanent way, and cars of said endless succession have running gear for cooperation with said supporting structures and have guide means for cooperation with said guiding structures to determine the relative angular arrangements of the successive cars as they move along the permanent way.

2. A railway as set forth in claim 1, wherein the adjacent cars are connected to each other, in combination with power means located at sections of the way along which said cars move at constant longitudinal speed, and means on said cars for cooperation with said power means to effect the propulsion of said succession of cars.

3. A railway as set forth in claim 1, wherein the adjacent cars are connected to each other, in combination with power means located at sections of the way along which said cars move at constant minimum and constant maximum longitudinal speed, and means on said cars for cooperation with said power means to effect the propulsion of said succession of cars.

4. A railway as set forth in claim 1, wherein the said running gear are connected to adjacent portions of two adjacent cars which turn in opposite directions.

5. A railway comprising an endless succession of elongated cars, a pair of track rails which approach and diverge from each other, and a plurality of running gears on each of said tracks, each of said running gears being connected to two adjacent cars at the meeting ends thereof.

6. A railway as set forth in claim 5, wherein the connection between each running gear and its two associated cars comprises a pivotal connection between the two said cars at the vertical edges thereof said pivotal connection being offset from the longitudinal axis of the cars toward the opposite track rail to that upon which said running is located.

7. In a railway, a car supporting track, an endless succession of cars having running gear for supporting the same upon said track, guiding structure along said track and guide means carried by said succession of cars for causing the said cars to turn horizontally with respect to their direction of travel, said guide means being carried only by those cars which turn in the same direction as the respective guide means cooperate with a particular guiding structure, and means controlling the distance between each two adjacent cars having guide means thereon.

8. The invention as set forth in claim 7, wherein each of said distance-controlling means comprises a member pivotally connected between each two adjacent cars having guide means thereon.

9. The invention as set forth in claim 7, wherein each of said distance-controlling means comprises a car pivotally connected between each two adjacent cars which have guide means carried thereby.

10. In a railway of the type stated, the combination with a plurality of cars, and means for supporting and guiding said cars for longitudinal movement and for turning movement in a horizontal plane, of means serially connecting said plurality of cars to each other, said connecting means including pivot joints permitting small relative displacements of the connected cars.

11. The invention as set forth in claim 10, wherein the said connecting means between adjacent cars of a group takes the form of pivotal joints having vertical axes, and the connecting means between such group of pivotally connected cars takes the form of a pivotal joint having a horizontal axis and a spring, whereby small relative displacement between cars of a group and between a group and adjacent cars may take place.

In testimony whereof I affix my signature.

FRANZ KRUCKENBERG.